United States Patent [19]

Roberts

[11] 4,406,515

[45] Sep. 27, 1983

[54] FIBER OPTIC CONNECTOR

[75] Inventor: Harold A. Roberts, North Attleboro, Mass.

[73] Assignee: Augat Inc., Mansfield, Mass.

[21] Appl. No.: 283,288

[22] Filed: Jul. 14, 1981

[51] Int. Cl.³ .............................................. G02B 7/26
[52] U.S. Cl. ................................ 350/96.21; 350/96.20
[58] Field of Search ................. 350/96.20, 96.21, 96.22

[56] References Cited

U.S. PATENT DOCUMENTS

| | | | |
|---|---|---|---|
| 4,090,778 | 5/1978 | Phillips et al. | 350/96.20 |
| 4,140,366 | 2/1979 | Makuch et al. | 350/96.22 |
| 4,140,367 | 2/1979 | Makuch et al. | 350/96.22 |
| 4,178,068 | 12/1979 | Hoover | 350/96.21 |
| 4,193,665 | 3/1980 | Arnold | 350/96.22 |
| 4,205,898 | 6/1980 | Matthews et al. | 350/96.21 |
| 4,208,092 | 6/1980 | Monaghan et al. | 350/96.21 |
| 4,325,607 | 4/1982 | Carlsen | 350/96.21 |
| 4,336,977 | 6/1982 | Monaghan et al. | 350/96.20 |
| 4,352,542 | 10/1982 | Tydings | 350/96.21 |

FOREIGN PATENT DOCUMENTS

| | | | |
|---|---|---|---|
| 2758964 | 7/1979 | Fed. Rep. of Germany | 350/96.21 |
| 2316611 | 1/1977 | France | 350/96.21 |
| 1558914 | 1/1980 | United Kingdom | 350/96.21 |
| 2057780 | 4/1981 | United Kingdom | 350/96.20 |

Primary Examiner—John D. Lee
Attorney, Agent, or Firm—Weingarten, Schurgin, Gagnebin & Hayes

[57] ABSTRACT

A fiber optic cable connector assembly for precise end-to-end mating of two fiber optic cables in a low loss light transmitting relation. An interconnect housing has loosely disposed and captured therein a floating spring metal sleeve of non-circular, multi-lobed cross-section having flared ends adapted to capture the sleeve within the housing and to guide opposing cylindrical ferrules, each containing and supporting a respective fiber optic cable, into resiliently held facing relationship within the sleeve. Each ferrule can include an oversized end member having a central aperture containing the end of the optical fiber, the outer periphery of the end member engaging the surrounding sleeve to coaxially align the optical fiber. A rearward cylindrical wall of the ferrule also engages the sleeve and prevents off-axis cocking of the ferrule in the sleeve. Means are provided to suspend the cable in the connector body without potting and to secure the outer jacket of the cable at its point of entry into the connector body. The end face of the ferrule is provided with an overflow well for receiving excess adhesive used to secure the end member on this face of the ferrule. Each cable is secured to a connector body which is attachable to the interconnect housing in a manner to minimize non-axial forces which could cause optical misalignment of the fiber ends.

15 Claims, 7 Drawing Figures

FIBER OPTIC CONNECTOR

FIELD OF INVENTION

This invention relates to fiber optic connectors and more particularly to a coupling system for the precise end-to-end mating of fiber optic cables.

BACKGROUND OF THE INVENTION

Various arrangements have been devised for a connectable and disconnectable fiber optic cable connector. One of the more significant problems of designing and building fiber optic cable connectors is that of maintaining adequate alignment at the light transmissive interface between the very small light carrying fibers of the typical fiber optic cables. To achieve good light transfer between fibers in an optical fiber connector, the two fibers must be accurately coaxially aligned. One method of obtaining this alignment, while protecting the fibers, is to contain the fibers in ferrules having matching diameters. The fibers are generally cemented or otherwise fastened in the ferrule so that they are concentric with the ferrule's outside diameter. After a cable has been secured in a ferrule, the ends of the optical fibers may be optically polished to enhance the percent of light transmitted between fibers.

The alignment of the ferrules with each other may be accomplished by insertion of the ferrules into a tube. If the tube is rigid some clearance must be designed into the parts, the amount of which depends on the precision of the parts. This clearance results in some misalignment of the small fibers causing coupling loss. However, if the sleeve is designed for interference fit with the ferrules, zero misalignment can be achieved with ferrules of the same diameter. For an interference fit, the sleeve must be resilient and the ferrules must be of slightly larger diameter than that of the sleeve.

At least one connector of this type has been manufactured using a plastic sleeve normally made of DELRIN. All plastics have a tendency to cold flow or creep to varying degrees, and the interference fit can become loose over time. Furthermore, plastics are dimensionally unstable with temperature variations as compared to metals. These instabilities defeat the purpose of an interference fit by introducing looseness between the ferrules and the sleeves resulting in fiber misalignment.

As illustrated in U.S. Pat. Nos. 4,205,898 and 4,193,665, alignment sleeves have been provided either with straight sides or with inwardly arcuate sides. These sleeves are, in general, mounted to an interconnect housing in a snug fit. One of the problems associated with a snug fit for the alignment sleeve is that connector bodies carrying ferrules must initially be accurately aligned with the sleeve. This requires the tolerances for the connector body and coupling apparatus to be exceedingly tight so as not to affect the axial alignment of opposing ferrules in the sleeve. Any tolerance errors in the coupling apparatus can provide forces transverse to the axis of the connector which can result in radial misalignment of the ferrules and thus the fibers contained therein.

Additionally, with flat sided or inwardly arcuate connector sleeve walls, contact with the ferrule is along relatively thin lines, thereby reducing the reliability of the overall connection system. Also, if flat-walled alignment sleeves are utilized, these sleeves are subject to fracture along the line of intersection between adjacent walls when ferrules are inserted into the sleeves.

Moreover, as will be appreciated, with flat-sided or inwardly arcuate walls, the sleeve must be substantially larger than the ferrule, which results in oversized interconnect housings since the housings must have inner diameters large enough to accommodate the relatively large sleeve.

By way of further background, U.S. Pat. No. 4,090,778 describes an optical fiber connector assembly which employs jewel-tipped ferrules in which the jewel diameter exceeds that of the cylindrical ferrule on which it is mounted. Oversided jewels are provided so that alignment of the fibers is made off the jewels rather than off the ferrules, e.g. from bearing surfaces established by the peripheries of the jewels vis-a-vis the ferrules. It will be appreciated that jewels, usually watch jewels, may be machined and manufactured to higher tolerances than a metal or plastic cylindrical member, with the hardness of the watch jewel providing an exceptionally stable alignment periphery.

One of the problems in utilizing the oversized jewel on an undersized cylindrical ferrule is that it is possible for the ferrules to cant or cock when inserted into an alignment sleeve.

Again, by way of further background, as illustrated in U.S. Pat. Nos. 4,140,366 and 4,140,367, an interconnect housing is provided in which an optical fiber is potted within the ferrule for providing structural rigidity and thus reliability. While potting is indeed desirable for connector reliability, it is oftentimes difficult and inconvenient to provide on-site potting.

SUMMARY OF THE INVENTION

In order to provide an easily assembled connector for precise end-to-end mating of fiber optic cables, the subject invention includes ferrule-tipped connectors and an interconnect housing to which opposing connectors are coupled, with the interconnect housing having a floating interference sleeve in the form of a spring metal tube loosely carried in the housing. The interference sleeve has flared ends to assist ferrule insertion and to retain the sleeve in the housing. The spring tube has a non-circular cross-section, with outwardly arcuate walls defining outwardly-projecting lobes adapted to resiliently receive in an interference fit opposing cylindrical ferrules inserted into the floating sleeve, thereby to provide precise coaxial alignment of the optical fibers carried by the ferrules. The diameter of the ferrule is such that upon entering the spring tube, the lobed shape is bent into a more nearly circular shape. As will be appreciated, in this invention the diameter of the ferrule is larger than the effective inside diameter of the sleeve. It should be noted that the effective outside diameter of the sleeve in a computer designed, preferred embodiment is only 13% larger than that of the ferrule, allowing freedom in choosing interconnect housing dimensions so as to avoid the use of oversized housings. Moreover, the use of a lobed structure increases the amount of the contact with the ferrule, since with outwardly arcuate lobes the contact with the ferrule bearing surface is along an arc as opposed to a line. This increases alignment accuracy and stability over that associated with straight sided or inwardly arcuate alignment tubes. The lobed structure is also one in which there are no sharp edges which can fracture. For a three-lobed configuration there are three relatively extensive arcs of contact down the length of the floating sleeve.

The use of a floating interference sleeve permits alignment by the sleeve alone and does not depend on initial alignment of the ferrules relative to a fixed sleeve. Thus, the floating sleeve system permits lower tolerances for connector housings and coupling apparatus and relieves the stress potential therebetween.

In one embodiment, each ferrule is terminated with an oversized annular end member in the form of a centrally apertured disc, with alignment being made from a bearing surface comprising the periphery of the disc, as opposed to the outer surface of the ferrule tube. The outside diameter of the ferrule end where the disc is mounted is of less diameter than the disc to improve alignment. To prevent canting or cocking of the ferrules in the sleeve, the diameter of the ferrule increases so as to match that of the disc at a distance back from the tip. This increased-diameter ferrule portion provides a bearing surface which coacts with the sleeve wall to prevent cocking when the ferrule is inserted into the sleeve.

The ferrule is mounted to and extends out of one end of a connector body which has a central channel through which the fiber optic cable is suspended. It is a feature of the subject invention that the space between the cable and the channel wall is left free of potting material. With the cable suspended in the channel, it has been found that potting material is not necessary for connector reliability due to a unique cable anchoring and clamping system at the end of the connector body where the cable enters. In one embodiment, the end of the connector body removed from the ferrule-retaining end is provided with an externally threaded inner tube. An internally threaded deformable crimp shell is secured to the connector body so that it coaxially surrounds the externally threaded inner tube. The threads on the tube and shell are spiralled in the same direction such that the cable jacket and braid folded back over the jacket, when inserted between the inner tube and the crimp shell, can be driven inwardly by rotating the connector.

In order to mount fiber optic cables having an optical fiber or fibers surrounded by a buffer layer, a braid and an outer jacket, a portion of the outer jacket is stripped from a portion of the fiber so as to leave a short length of the braid which is then folded back over the end of the jacket. The buffer layer is stripped from the end of the optical fiber and the exposed fiber end is inserted through the connector body channel and through the central aperture in the end member. While rotating the connector with the optical fiber extending through the end member aperture, the jacket end with the folded back braid is forced between the crimp shell and the inner tube and is driven inwardly so that it is sandwiched between the external threads on the inner tube and the internal threads of the crimp shell. The crimp shell is then crimped inwardly to secure the optical fiber cable to the connector. In one embodiment the crimp shell is cylindrical and is crimped to a hexagonal shape.

As will be appreciated, the above-mentioned threads may be given the same pitch. In another embodiment the threads on the externally threaded tube are given a greater pitch to advance the nonfolded-back braid faster than the folded-back braid to draw the braid tight around the cut end of the jacket to prevent bunching of the braid at the jacket end. Alternatively, the threading may be omitted from the inner tube and shell.

The end of the optical fiber extending through the central aperture of the end member is adhesively attached to the end member, usually with an epoxy which is wicked through the space between the fiber and the aperture. After hardening, the fiber extending from the end member is trimmed substantially flush with the face of the end member and the face is polished.

In order to secure the connector to the interconnect housing carrying the floating sleeve, the exterior surface of the interconnect housing is provided with external threads and a connecting nut loosely carried on the connector body is screwed down over the external threads of the interconnect housing. The connecting nut has an inner lip that engages a tapered flange on the connector body so that when the connecting nut is rotated, it draws the connector body and the interconnect housing together, with the nut pivoting about a point on the connector axis. The tightening of the nut thus exerts only axial forces on the ferrule, thereby preventing the generation of transverse forces which would affect the alignment provided by the floating interference sleeve. The floating interference sleeve thereby serves as the only portion of the connector which defines the axial alignment of the ferrules.

It will be appreciated that the connector functions to provide precise secure axial alignment of ferrules because of the combination of features described, acting either together or separately to provide a reliable connector.

It should be mentioned that this interconnect in which the alignment interference sleeve is captive, is more convenient than prior-art versions in which the tiny sleeve is separate and can become lost. Also, the interconnect housing which retains the sleeve becomes, in effect, the female while the remaining connector is the male.

BRIEF DESCRIPTION OF THE DRAWINGS

These and other features of the invention will be better understood in connection with the following description taken in conjunction with the drawings of which.

DETAILED DESCRIPTION

Figure 1:
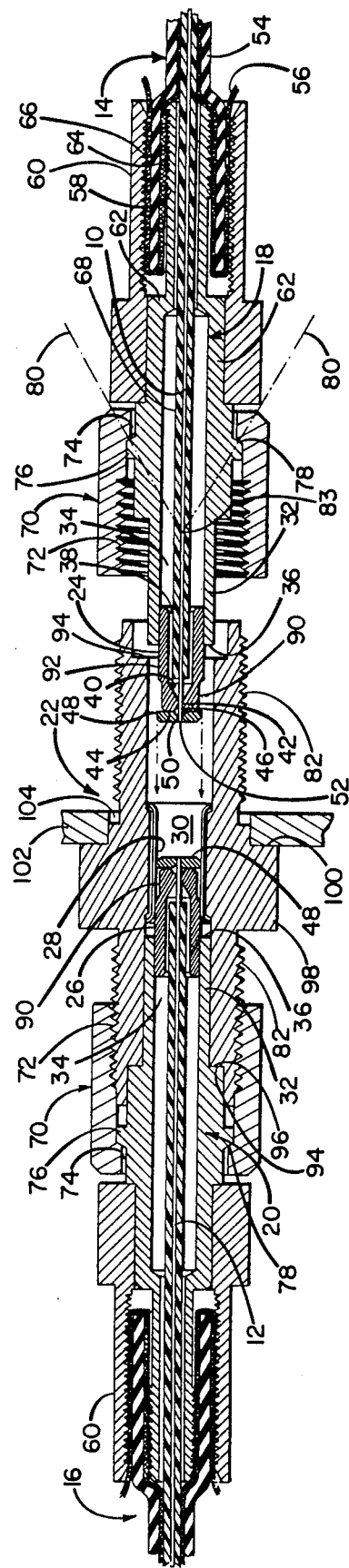
FIG. 1 is a cross-sectional and exploded view of a connector assembly showing opposed ferrules mounted in respective connector bodies and inserted into a floating sleeve carried within an interconnecting housing.

Referring now to FIG. 1, in order to provide alignment for optical coupling of optical fibers 10 and 12 within respective cables 14 and 16, each of the fibers is suspended within a respective connector body 18 and 20. It will be appreciated that the optical fiber 10 or 12 may be either a single strand of fiber or may be in the form of an optical fiber bundle. Connector bodies 18 and 20 are detachably mounted to an interconnect housing 22, such that the ends of opposing ferrules 24 and 26 are coaxially located within a thin-walled floating sleeve 28, loosely carried and captured within a central channel 30 of the interconnect housing 22. The description of the operation of the floating sleeve is discussed hereinafter in connection with the description of FIG. 2.

Each connector body 18 and 20 has an elongate tubular extension 32 and a central channel 34 of a diameter to receive a ferrule inserted at end 36 thereof. Each ferrule has a central channel 38 which is tapered as illustrated at 40 to permit the insertion of an optical fiber through a central aperture 42 in face 44 of the ferrule. Face 44 is provided with a countersunk overflow well 46 adapted to receive excess adhesive from the cementing of an oversized end member 48 to face 44. Well 46 is centrally located such that aperture 42 communicates with the well. As mentioned, oversized end member 48 is adhesively attached to face 44 of ferrule 24, with the end member being centrally apertured at 50 so as to receive an end 52 of an optical fiber.

The fiber optic cable as illustrated at 14, has an outer jacket or casing 54, with a Kevlar braid 56 folded back over the end of jacket 54 as illustrated. The jacket and braid are sandwiched between a tubular extension 58 of connector body 18 and a coaxially located crimp shell 60 which is secured to end 62 of each connector body. The crimp shell is made of deformable material, in one embodiment annealled brass. Moreover, in crimping the shell inwardly, a shell nominally of a cylindrical configuration may be given a hexagonal cross-section by a conventional hexagonal crimping tool (not shown). Tubular extension 58 is provided with exterior threads 64, with the crimp shell being provided with interior threads 66, at least a portion of which are radially spaced from threads 64.

The folding back of braid 56 provides a length of fiber optic cable having a buffer layer 68. The optical fiber with layer 68, is suspended in central channel 34 between the associated ferrule and the distal end of the associated connector body, such that there need be no potting material provided in channel 34. The anchoring system provided by the adhesive attachment of end 52 of the optical fiber and the crimping of the cable jacket and braid at the distal end of the connector results in a sufficiently rigid system for suspending the fiber optic cable within the connector body without potting. Alternatively, a non-adhesive system may be provided at the end member for anchoring the optical fiber.

Each connector body 18 or 20 is provided with a loosely held nut 70 coaxially mounted thereon. The nut carries internal threads 72 at its proximal end and has an aperture 74 of a diameter larger than the external diameter of the connector body, but smaller than the outside diameter of an annular flange 76 carried on the connector body. Flange 76 has an annular surface 78 which is tapered or sloped from the distal to the proximal end of the connector body. In one embodiment, the angle of this sloped, tapered surface is 20° with respect to the central axis of the connector body. Normals 80 to these surfaces meet at a point 83 along the central axis of the connector body, thereby to provide a point about which nut 70 is free to pivot when nut 70 is tightened down on exterior threads 82 of interconnect housing 22.

Because sleeve 28 is floating within chamber 30 of interconnect housing 22 and because of the ability of nut 70 to pivot about a point on the longitudinal axis of the connector assembly, only axial forces are applied to the ferrule as it is forced into the interference sleeve by the tightening of the nut. Since no transverse or non-axial forces are applied to the ferrule by the virtue of tightening of nut 70, it is the operation of floating sleeve 28 alone which provides for the alignment of the optical fibers carried within the opposing ferrules.

In one embodiment, the interference fit of oversized end member 48 within the interior wall of sleeve 28 provides for the precise coaxial alignment of fibers 10 and 12 when ferrules 24 and 26 are inserted into the floating sleeve. End members 48 are, in general, apertured discs, the peripheries of which may be machined to exceptionally tight tolerances. When these peripheries provide bearing surfaces for an interference fit with the walls of the interference sleeve, the fiber alignment is dependent upon the periphery of the end member alone.

In one embodiment the ferrule is provided with a rearwardly extending tubular section 92 which has an augmented diameter matching that of the end member. This provides a bearing surface spaced from that associated with the periphery of the end member. This bearing surface, when engaging the interior wall of the sleeve, prevents off-axis cocking of the end member and ferrule in the sleeve.

It will be noted that a seat 94 may be provided within the central channel 30 of interconnect housing 22, which serves as a stop for a mating shoulder 96 of each connector body 18 or 20, such that when each connector body 18 or 20 is fully inserted into the interconnector housing 22, the mating of these elements limits the penetration of the corresponding ferrule into the floating sleeve. This spacing may be adapted such that the opposing faces of the end members are in intimate contact or, alternatively, may provide for a predetermined limited spacing between the faces when the ferrules are inserted into the floating sleeve. Moreover, interconnect housing 22 may be provided with an enlarged bulkhead 98 which defines a shoulder 100 adapted to coact with a mounting plate 102 having an aperture 104 through which the right hand portion of the interconnect housing 22 may be inserted. Alternatively, housing 22 may have a continuous external thread.

Floating Sleeve

Figure 2:
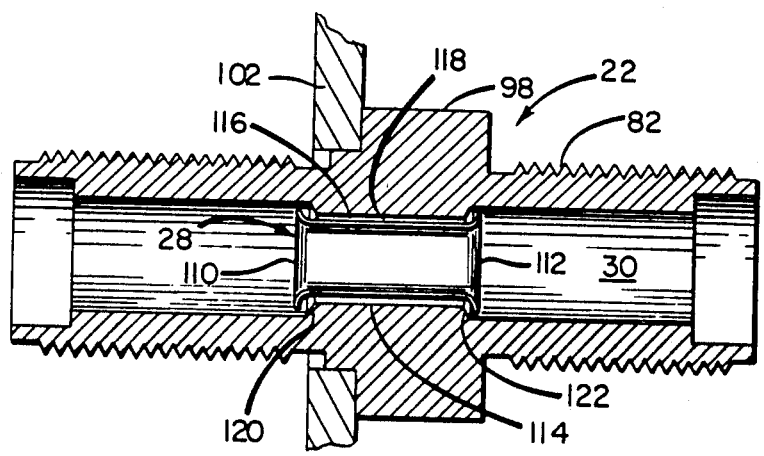
FIG. 2 is an enlarged cross-sectional illustration of the interconnect housing and floating sleeve of FIG. 1.

Referring to FIG. 2 as illustrated, sleeve 28 is loosely mounted and captured within channel 30 of interconnect housing 22. The containment of the sleeve in the housing is accomplished by flared end portions 110 and 112 when cooperate with an inwardly extending annular shoulder 114 that defines a reduced diameter bore 116 through which a main body portion 118 of the interference sleeve projects. As can be seen from this figure, the interference sleeve is floating in the sense that space is provided between the flared portions of the sleeve and the shoulder so as to permit limited axial and radial movement of the sleeve. Lateral movement of the sleeve is permitted due to the space between the main body portion of the sleeve and shoulder 114. Because the sleeve is floating, it is the sleeve, and the sleeve alone, which restrains the inserted ferrules. In one embodiment, the sleeve is a spring metal extrusion and is made of berrylium copper. However, sleeve 28 may be made of any stiff, partially-resilient, deformable material which does not exhibit creep. It will be appreciated that the axial movement of the sleeve is limited by annular surfaces 120 and 122 of shoulder 114, with the spacing between these surfaces being less than the spacing between opposing flared portions 110 and 112 of sleeve.

Figure 3:
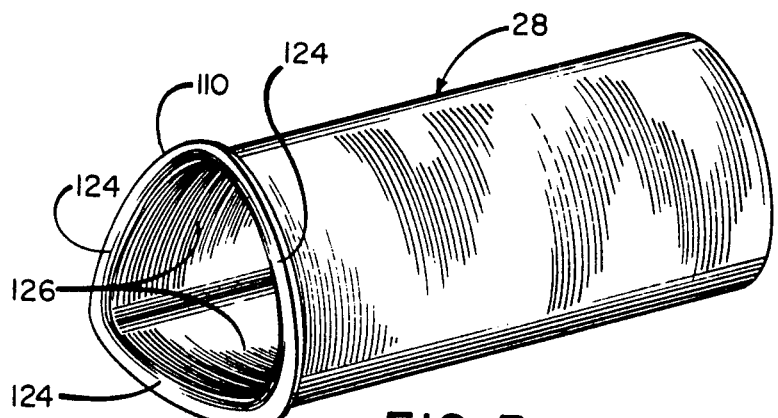
FIG. 3 is an isometric view of an interference sleeve having an outwardly extending lobe structure, with one end of the sleeve having been flared.

As illustrated in FIG. 3, interference sleeve 28 may be configured so as to have three circumferentially extending lobes 124. Thus, in cross-section, rather then being circular, the cross-section of the sleeve is non-circular and includes outwardly arcuate walls 126 defined by the aforementioned lobes 124 to resiliently hold the end members 48 and tubular sections 92. Sleeve 28 may be an extruded member which is provided with flared portion 110 at one end thereof as shown.

Figure 4:
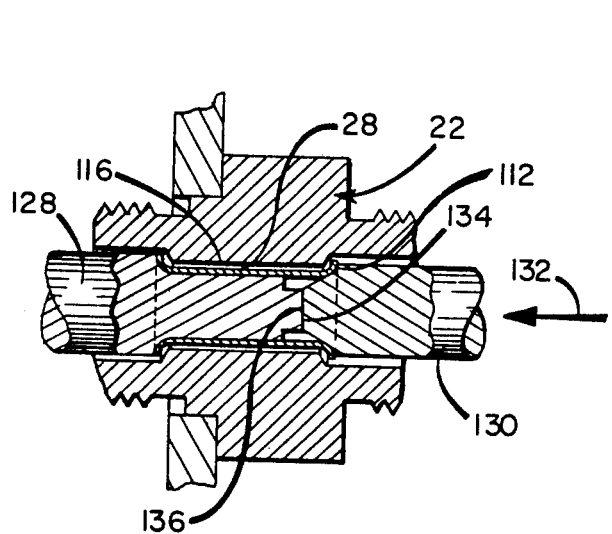
FIG. 4 is a cross-sectional illustration of arbor press for flaring the non-flared end of the interference sleeve of FIG. 3 after the sleeve of FIG. 3 has been inserted into the interconnect housing.

Referring to FIG. 4, in order to capture sleeve 28 in housing 22, the unflared end of the sleeve is first inserted into channel 116 and a mandrel 128 having an exterior configuration matching that of the interior configuration of the left hand portion of the sleeve is inserted into the sleeve as illustrated. Flared portion 112 is then formed by an opposing mandrel 130 which is forced in the direction of arrow 132 towards mandrel 128 by means of an arbor press (not shown). The flaring of the interference sleeve at the right hand end is complete when opposing ends 134 and 136 of mandrels 130 and 128 come into contact.

The flaring of the ends of the interference sleeve provide for ready access of the ferrules and also provide an annular surface which coacts with an internal annular shoulder to permit limited movement of the sleeve within the housing, while at the same time preventing the sleeve from coming out.

Figure 5:
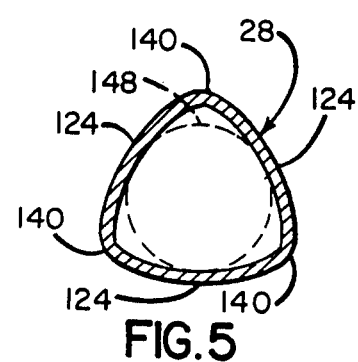
FIG. 5 is a cross-sectional illustration of the outwardly lobed interference sleeve of FIG. 3.
Figure 6:
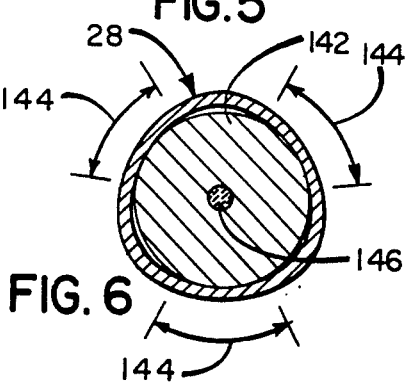
FIG. 6 is a cross-sectional illustration of the interference sleeve of FIG. 3, illustrating the effect of inserting a ferrule into the sleeve, also showing the arcuate contact of the ferrule bearing surface with the interior wall of the interference sleeve.

As mentioned hereinbefore, the floating sleeve, in the preferred embodiment, has a non-circular cross-section. Referring to FIG. 5, a three-lobed structure is illustrated in which lobes 124 are depicted as outwardly arcuate with the end of the arcuate sections joined at a rounded corner such as illustrated at 140. The rounded corner prevents a fracture when a ferrule is inserted into the interference sleeve. The effect of inserting a ferrule in the interference sleeve is illustrated in FIG. 6 in which a cylindrical ferrule having a circular face 142 is depicted after insertion into sleeve 28. As illustrated by arrows 144, there is an arcuate region of contact between the inner walls of the sleeve and the periphery of the ferrule so as to provide for increased stability and accuracy in the alignment of a centrally carried optical fiber, here illustrated at 146.

Note that the effective internal diameter of the lobed sleeve of FIG. 5 is illustrated by dotted circle 148 and that the outside diameter of the ferrule to be inserted in such a sleeve must exceed this effective internal diameter. This being the case, when the ferrule is inserted into the sleeve, the sleeve becomes more nearly circular in cross-section, with the smaller the difference in the abovementioned diameters, the more nearly circular that the sleeve will become. The more nearly circular that the sleeve becomes, the more extensive is the arcuate contact with the exterior surface of the ferrule such that coaxial alignment becomes more precise and the stability of the connector increases.

Ferrule Alignment

Figure 7:
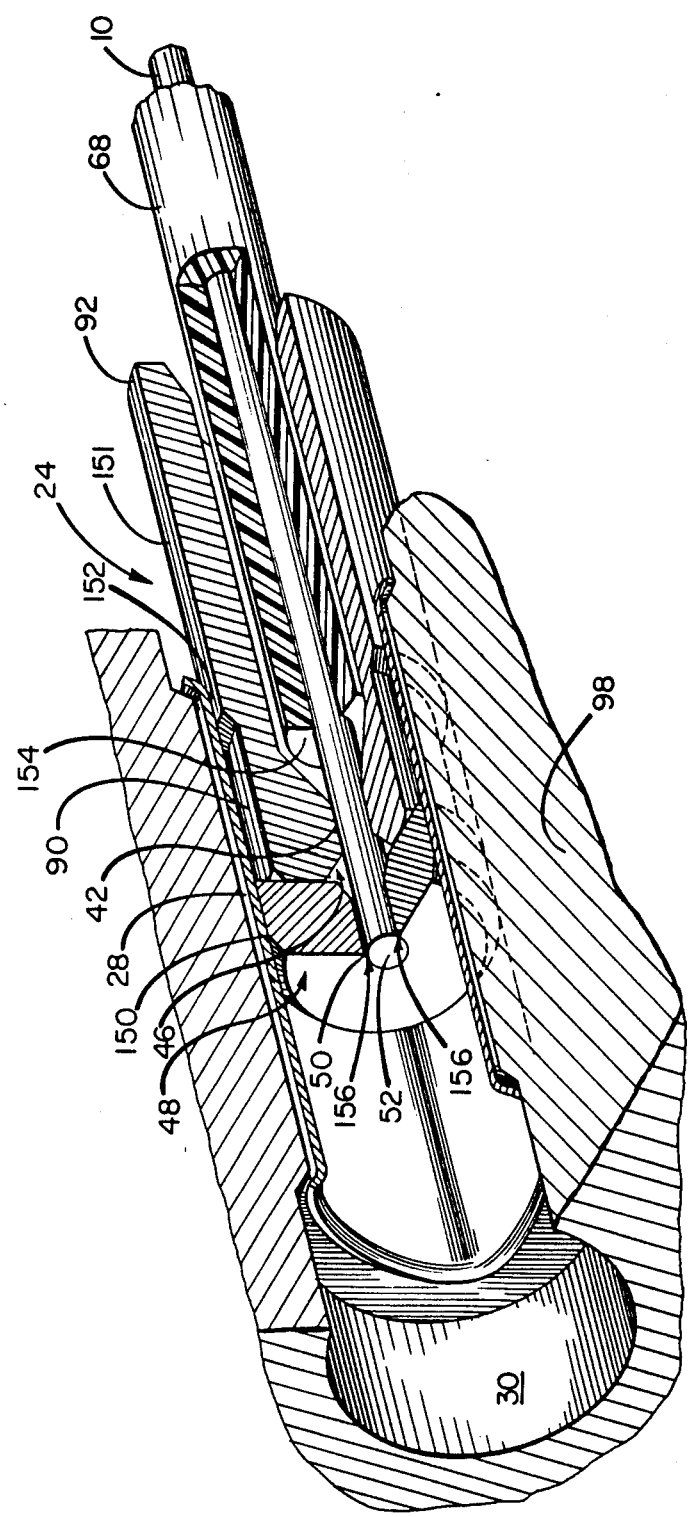
FIG. 7 is a partial cross-sectional and isometric illustration of the ferrule of FIG. 1 inserted into a lobed interference sleeve in the interconnect housing.

Referring now to FIG. 7, ferrule 24 is shown inserted into floating sleeve 28 with the coaxial alignment of the ferrule being provided by outer periphery 150 of end member 48. This periphery is in interfering contact with a portion of the interior wall of the sleeve as described in connection with FIG. 6. The ferrule is prevented from canting or cocking within the sleeve by bearing surface 151 of tubular section 92 and its intimate contact with a portion 152 of the floating sleeve axially spaced from the end member/sleeve interface. Since the diameters of the end member and tubular section are identical, coaxial alignment of ferrule 24 within sleeve 28 is assured.

Adhesive Attachment of Optical Fiber

In order to secure the proximal end of the optical fiber in the ferrule, layer 68 is stripped back as illustrated at 154 so as to expose a length of optical fiber. When mounting the optical fiber in the ferrule so as to suspend the optical fiber in the connector body, the exposed end 52 of the optical fiber is passed through ferrule aperture 42 and aperture 50. Thereafter, adhesive is provided as a bead surrounding the fiber end and part of the adhesive is introduced into the aperture as indicated by arrows 156, in that the adhesive wicks past the portion of the optical fiber extending through the aperture in the end member. Upon hardening of the adhesive, the proximal end of the optical fiber is secured to the end member. Thereafter, the portion of the optical fiber extending from the bead is cut off substantially flush with the bead of adhesive and the bead and fiber optic end are ground substantially flush with the face of the end member. Thereafter the face of the end member is polished optically smooth.

In summary, what has been provided is an assembly for precise end-to-end mating of fiber optic cables which includes an interconnect housing having a floating interference sleeve in the form of a spring metal tube loosely contained in the housing, with the interference sleeve having flared ends to assist ferrule insertion and to retain the sleeve in the housing. The spring tube has outwardly arcuate walls defining outwardly projecting lobes adapted to resiliently receive opposing cylindrical optical fiber containing ferrules in an interference fit, with the floating sleeve serving as the only portion of the connector which is responsible for the axial alignment of the optical fibers. The connector may include a centrally apertured oversized end member for each ferrule, an undersized ferrule tube, and a shaft extension mounted to the distal end of the ferrule tube, the extension having a diameter which matches that of the end member, the end member providing precise alignment and the shaft extension preventing cocking of the ferrule in the sleeve. The ferrule is mounted to a connector body having a central channel and is itself provided with a central channel aligned with the central aperture in the end member, with the face of the ferrule having a countersunk frusto-conical aperture which forms an overflow well for receiving adhesive left-over from securing the end member to the ferrule. Anchoring means are provided for suspending the fiber optic cable through the connector body along the central axis of the connector without utilization of a potting compound. The anchoring means includes a specially adapted crimp shell which coacts with an inner tube to sandwich the fiber optic jacket and braid therebetween. A loosely held connector nut and mating tapered flange on the connector body provide that when the connector body is secured to the interconnect housing only axial forces are applied to the ferrule, thereby facilitating alignment through the operation of the floating sleeve alone.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for joining optical fibers so as to effect coaxial alignment of the ends of a pair of opposed optical fibers comprising:

generally cylindrical ferrules for housing respective fibers along the central axis thereof;

an interconnect housing having a central bore and annular shoulder projecting into said bore so as to define a bore of decreased diameter;

a thin-walled sleeve mounted through the annulus defined by said shoulder, said sleeve having dimensions which permit said sleeve to float within said decreased diameter bore, each end of said sleeve being outwardly flared and adapted to coact with a respective end of said shoulder to retain said sleeve in said housing while permitting limited axial movement of said sleeve in said housing; and, means coupled to said housing for positioning said ferrules in said sleeve such that the faces thereof are in opposition in said sleeve.

2. The apparatus of claim 1 wherein the faces of the ferrules have matching circular cross-sections and wherein said sleeve has arcuate outwardly extending walls so as to define lobes, with the closest approach of the walls to the central axis of said sleeve defining an effective diameter less than the diameter of the face of said ferrules, whereby when said ferrules are in an interference fit with said sleeve, at least the face portions of the ferrules cause the cross-section of said sleeve to become more nearly circular.

3. The apparatus of claim 1 and further including a disc-shaped end member at the face of each ferrule, said end member having a diameter greater than the diameter of said ferrule, said ferrule further including a cylindrical shaft spaced axially from said end member a distance which ensures that a portion of said shaft will reside in said sleeve when said ferrule is inserted in said sleeve, said shaft having a diameter matching that of said end member, whereby cocking of said ferrule in said sleeve is prevented.

4. The apparatus of claim 1 wherein said ferrule positioning means includes a connector body having a central interior channel therethrough, means for mounting said ferrule to one end of said connector body, said connector body having a centrally-channelled extension projecting along the central axis of said body away from said one end, and further including a hollow deformable crimping shell secured to said connector body so as to coaxially surround said extension.

5. The apparatus of claim 4 wherein said extension carries external threads at the distal end thereof and wherein said shell has an interior wall carryig internal threads in spaced adjacency to said external threads.

6. The apparatus of claim 1 wherein said ferrule positioning means includes a connector body having an interior channel therethrough, means for mounting said ferrule to one end of said connector body, and means adapted to suspend an optical fiber in said interior channel without potting material between said fiber and the walls of said channel.

7. The apparatus of claim 6 wherein said fiber includes an outer casing and wherein said means for suspending said fiber includes means for adhesively attaching the proximal end of said fiber to said ferrule and means for securing the outer casing of said fiber to the distal end of said connector body.

8. The apparatus of claim 7 wherein said outer casing securing means includes a centrally-channeled extension at the distal end of said connector body, said extension projecting along the central axis of said body away from the ferrule-containing end, and a hollow deformable crimping shell secured to said connector body so as to coaxially surround said extension, whereby said outer casing may be sandwiched between said extension and said shell.

9. The apparatus of claim 1 wherein said interconnect housing is generally cylindrical and includes external threads on a portion thereof, and wherein said ferrule positioning means includes a connector body and means for mounting said ferrule to said connector body, said connector body further including an external annular flange having a distal surface which defines a taper sloped towards the proximal end of said connector body, and a nut carried loosely on said connector body, said nut being adapted to slip over said interconnect housing in a coaxial fashion and having internal threads at one end and an aperture at an opposite end, said aperture having a diameter larger than that of said connector body but smaller than the outside diameter of said flange.

10. The apparatus of claim 1 wherein each of said ferrules has a central channel opened outwardly at the face of the ferrule so as to form a well and further including an end member having a central aperture, said end member being secured to the face of said ferrule such that said aperture communicates with the channel of said ferrule at said well.

11. In an interconnect housing utilized for the joining of optical fibers so as to effect coaxial alignment of the ends of a pair of opposed optical fibers, an alignment sleeve of non-circular cross-section, said sleeve having outwardly arcuate walls which define lobes.

12. The sleeve of claim 11 wherein the juncture of adjacent walls defining a pair of lobes is rounded.

13. The sleeve of claim 11 wherein the ends of said sleeve include outwardly extending flared portions.

14. The sleeve of claim 11 wherein said sleeve is made of spring metal.

15. The sleeve of claim 11 wherein said sleeve has three lobes.

* * * * *